No. 655,279. Patented Aug. 7, 1900.
B. A. STEWART.
WINDING MACHINE.
(Application filed Nov. 28, 1899.)
(No Model.) 6 Sheets—Sheet 2.

WITNESSES:
INVENTOR
Burdick A. Stewart.
BY
ATTORNEY.

No. 655,279. Patented Aug. 7, 1900.
B. A. STEWART.
WINDING MACHINE.
(Application filed Nov. 28, 1899.)
(No Model.) 6 Sheets—Sheet 4.

WITNESSES:
George T. Hackley
Emerson R. Newell

INVENTOR
Burdick A. Stewart.
BY
ATTORNEY

No. 655,279. Patented Aug. 7, 1900.
B. A. STEWART.
WINDING MACHINE.
(Application filed Nov. 28, 1899.)
(No Model.) 6 Sheets—Sheet 5.

WITNESSES:

INVENTOR
Burdick A. Stewart.
BY
ATTORNEY

UNITED STATES PATENT OFFICE.

BURDICK A. STEWART, OF PITTSFIELD, MASSACHUSETTS.

WINDING-MACHINE.

SPECIFICATION forming part of Letters Patent No. 655,279, dated August 7, 1900.

Application filed November 28, 1899. Serial No. 738,522. (No model.)

*To all whom it may concern:*

Be it known that I, BURDICK A. STEWART, a citizen of the United States, residing at Pittsfield, county of Berkshire, State of Massachusetts, have invented certain new and useful Improvements in Winding-Machines, of which the following is a full, clear, and exact description.

My invention primarily relates to winding-machines; and one of my objects is to provide a machine which will automatically wind a covering of tape upon an endless form, such as a coil of a transformer. Heretofore such coils have been wound with tape by hand, but it is obvious that such an operation is slow and the winding is not uniform.

In the preferred embodiment of my invention shown in the drawings.

Figure 1:
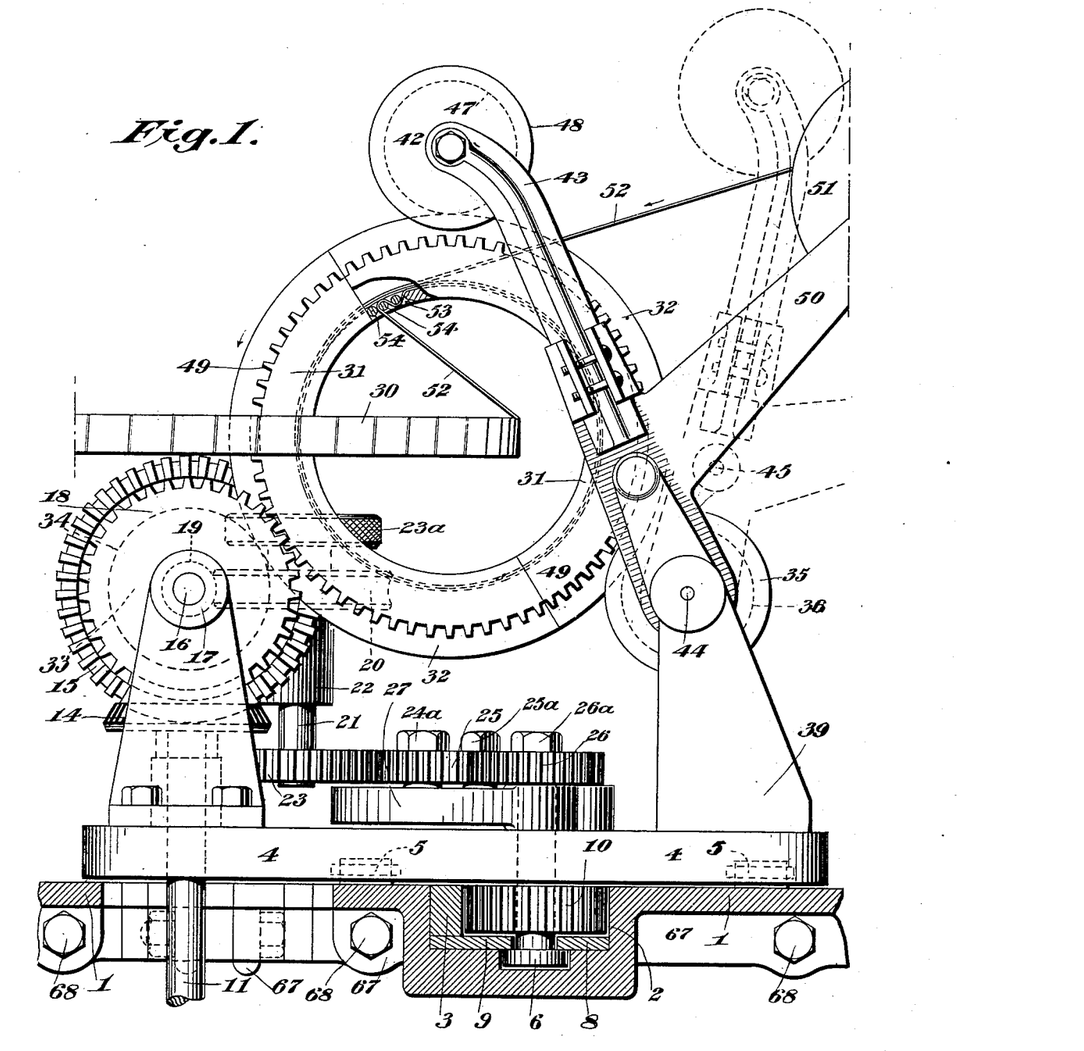
Figure 1 is a side elevation of the carriage and bobbin with the table partly in section, showing the method of applying tape to a coil.
Figures 2, 3:
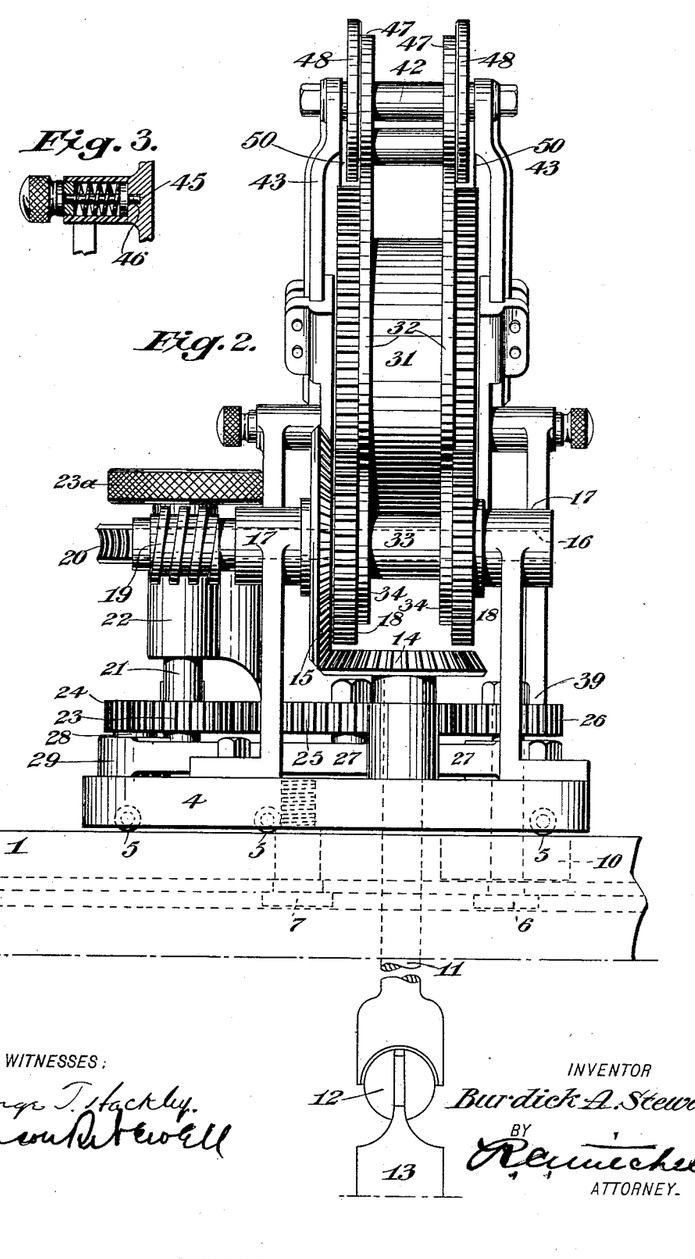
Fig. 2 is a side elevation of the carriage and bobbin without the tape.
Fig. 3 is a detail of the locking mechanism for the movable arm which carries one of the holding-wheels.

In the above preferred embodiment, 1 is a table, preferably oval in shape, as transformer-coils are usually of an oval form, and this table is provided with a guideway, preferably forming an endless circuit, in this embodiment formed by a depression 2 in the upper face of the table, and this depression may be provided with a rack 3. 4 is a carriage mounted upon rollers 5 and adapted to move along the upper face of the table and held by T-shaped studs 6 and 7, which slide in said guideway, the heads thereof being held by strips 8 and 9, as clearly shown in Figs. 1 and 2. The stud 7 is preferably fixed to the carriage, but the stud 6 may be rotatably mounted in the carriage, and to this stud is fixed a gear-wheel 10, meshing with the rack 3.

11 is a movable shaft located, preferably, in the open portion in the center of the table, journaled on the carriage, and connected by a universal joint 12 (see Fig. 2) with the end of another shaft 13, driven by any suitable power. At the upper end of the shaft 11 is a bevel gear-wheel 14, meshing with a second bevel-gear 15, splined to a shaft 16, mounted in bearings 17 on the carriage. To this shaft are also fixed gear-wheels 18 18 for driving the bobbin, as will be hereinafter described. The shaft 16 carries at one end a worm 19, which meshes with a worm-wheel 20 on the shaft 21, mounted in bearing 22 on the carriage, and this shaft carries at its lower end a gear-wheel 23.

23$^a$ is a thumb-nut to retain worm-wheel 20 in position.

A gear-train, in this embodiment including gears 23, 24, 25, and 26, the gear 26 being mounted upon the rotatable stud 6, forms a connection between gears 23 and 10 to move the carriage bodily along the guideway.

Figures 5, 6:
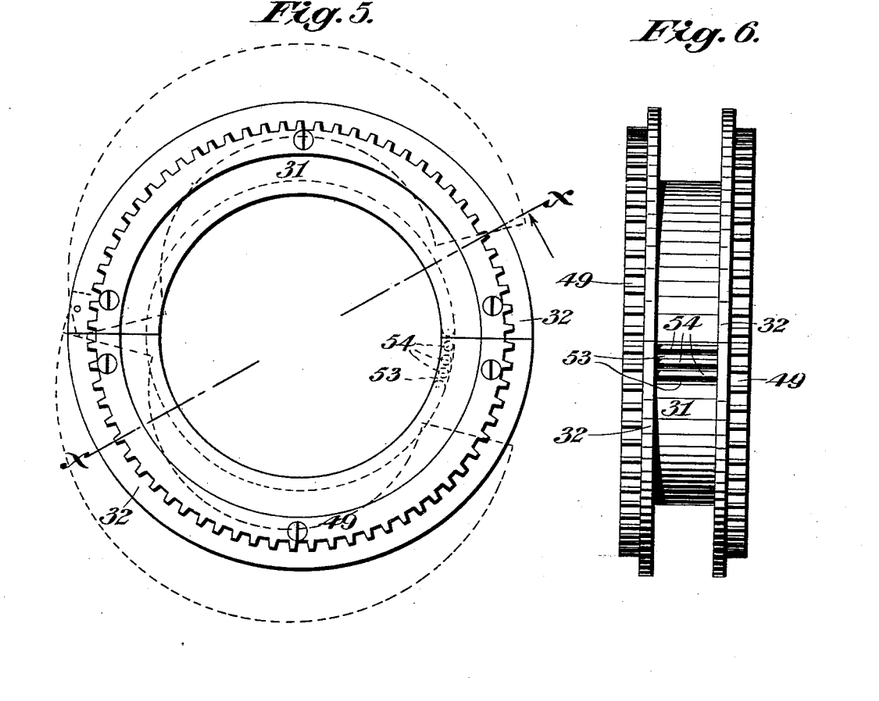
Fig. 5 is a side elevation of the bobbin closed, the dotted line showing it in a slightly-opened position to receive the coil or other part to be wound.
Fig. 6 is a front view of the bobbin shown in Fig. 5.
Figure 7:
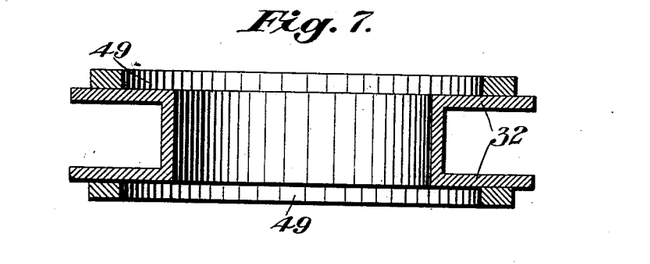
Fig. 7 is a section on the line X X of Fig. 5.

To wind the material upon the transformer-coil 30 or other object to be wound, I provide a guide for the covering material, which guide is carried by the carriage, and automatic means to revolve the guide around the part to be wound as the carriage moves along the guideway. In this embodiment the transformer-coil 30 or other part to be wound is inclosed within a hollow bobbin, preferably of the shape shown in Figs. 5, 6, and 7. This bobbin is preferably split, as shown in Fig. 5, and the two parts pivoted together, so that the bobbin can be opened to receive the part to be wound within its unobstructed hollow portion. The flanges 32 at each side of the periphery of the bobbin preferably rest on rotatable supports formed by a pulley 33, loose on the shaft 16, having smooth-faced portions 34 34, and an idle pulley 35, having smooth-faced portions 36 and the flanges 37. This pulley 35 is mounted in bearings 38, carried by a movable portion 39, attached to the carriage by bolts 40, passing through slots 41 in said movable portion. In this way the pulley 35 can be adjusted to or from the wheel 33. 42 is a second smooth-faced wheel idly mounted at the upper end of a pair of arms 43 43, adjustable in length, as shown, and pivoted at 44, so that the wheel 42 can be thrown back, as shown in dotted lines in Fig. 1, so that the bobbin may be removed. 45 is a depression in the lower part of one or both of these arms 43, into which may snap spring-pressed pins 46, one of which is shown in Fig. 3, to hold the arm in position. This wheel 42 has smooth-faced portions 47 47 and flanges 48. The bobbin 31 is thus supported by the smooth-faced wheels 33, 35, and 42 and is prevented from lateral movement by the gear-wheels 18 and the flanges 37 and 48, which project beyond the point of contact between the flanges 32 of the bobbin and the smooth faces of said wheels 33, 35, and 42. The bobbin may be also provided on each side with circular racks 49, with which the gears 18 engage to rotate the bobbin.

50 is an arm attached to the carriage, which may carry a second bobbin 51, supplying the covering material 52 to the bobbin. This covering material, such as a tape, (shown particularly in Fig. 1,) is passed onto the periphery of the bobbin, between the flanges thereof, and through a guide 53, formed by an opening from the periphery to the hollow portion of the bobbin and from thence to the transformer-coil or other portion to be wound, 30. 54 54 are bars, which may be rollers placed across this opening 53 longitudinally of the axis of the bobbin, and the tape may be passed under and over two or more of these bars, as desired, to form a means for varying the resistance to the passage of the material through this guide, and consequently varying the tightness with which the tape is applied.

It will be obvious that when the shaft 11 is rotated the carriage will be driven by the turning of the gear 10 along the guideway, and at the same time the bobbin will be rotated. This will revolve the guide 53 around the coil 30 within the bobbin and will wind the tape or other material upon the same. One revolution of the bobbin will wind upon itself a length of tape equal to the length of the circumference of the bobbin; but as the periphery of a cross-section of the coil is less than the circumference of the bobbin one revolution of the bobbin will only draw off from the bobbin a length of tape equal to the periphery of this cross-section of the coil. Therefore the layers of tape on the bobbin will increase as the bobbin continues to revolve. As the tape is wound onto the coil it is pulled off from the inner layer on the bobbin, and the whole mass of tape already wound thereon slides around the periphery of the same.

I prefer to have on the supply-bobbin 51 only enough tape to wind the coil 30 or other part, so that as the winding goes on the layers of tape held by the bobbin 31 will increase, and then after the last of the tape has run off from the supply-bobbin 51 onto the bobbin 31 the number of layers will gradually decrease. It would seem that the increase of number of layers of tape on the bobbin would increase the friction on the periphery thereof as the tape is drawn off; but I have found that it makes very little, if any, difference how many layers of tape are on the bobbin 31, because the only friction developed is between the inner layer of tape and the periphery of the bobbin, and the friction of the edges of the other layers against the flanges 32 of the bobbin is inconsiderable. By winding the tape thus upon the bobbin the bobbin 31 becomes a holder for the tape, and as the bobbin is revolved both the holder for the tape and the guide are revolved about the part to be wound.

Figure 4:
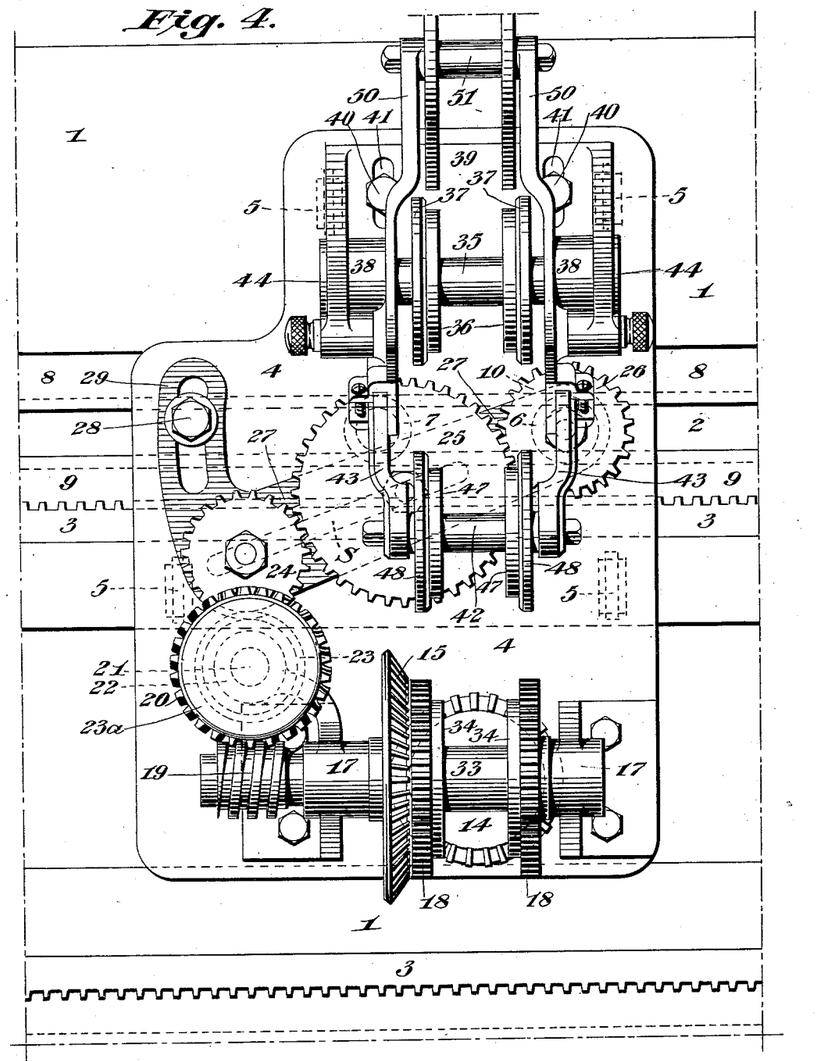
Fig. 4 is a plan view of the carriage and one side of the table, the bobbin having been removed.

To vary the relative speed of rotation of the bobbin and the forward movement of the carriage, so as to vary the overlap of the coils of tape on the part 30, I have provided a variable-speed train between the bobbin and the rack. I may remove any of the wheels 23, 24, 25, and 26 and substitute a larger or smaller wheel therefor, but I preferably make the wheel 26 removable by means of the nut 26ª. To allow for the variation in diameters of such substituted wheels, I have provided a pivoted arm 27, the pivot of which coincides with that of the wheel 26. If a larger or smaller wheel were substituted for the wheel 26, the position of wheels 24 and 25 would have to be changed, and I have therefore mounted these wheels on bolts 24ª and 25ª, passing through a slot S in said arm 27, so that they can be moved longitudinally of it to properly mesh with each other. If the wheel 24 is moved from the position shown in Fig. 4, it will be obvious that it will not properly mesh with the wheel 23; but as the arm 27 is movable about its pivot the wheels 24 and 23 can be brought into their proper relation and the arm then fixed in position by means of a bolt 28, which passes through a slotted extension 29 from the arm and into the carriage.

To hold the coil 30 or other part to be wound, I have provided supports in the path of the bobbin and guide, which are automatically moved from the path of the guide as the same approaches the supports. In the present embodiment these supports include a base 55, pivoted to the table at one side of the line of motion of the carriage, as at 56, Fig. 12, so that the same may be readily pushed aside by the carriage, as seen in dotted lines in Fig. 11.

Figures 11, 12, 13:
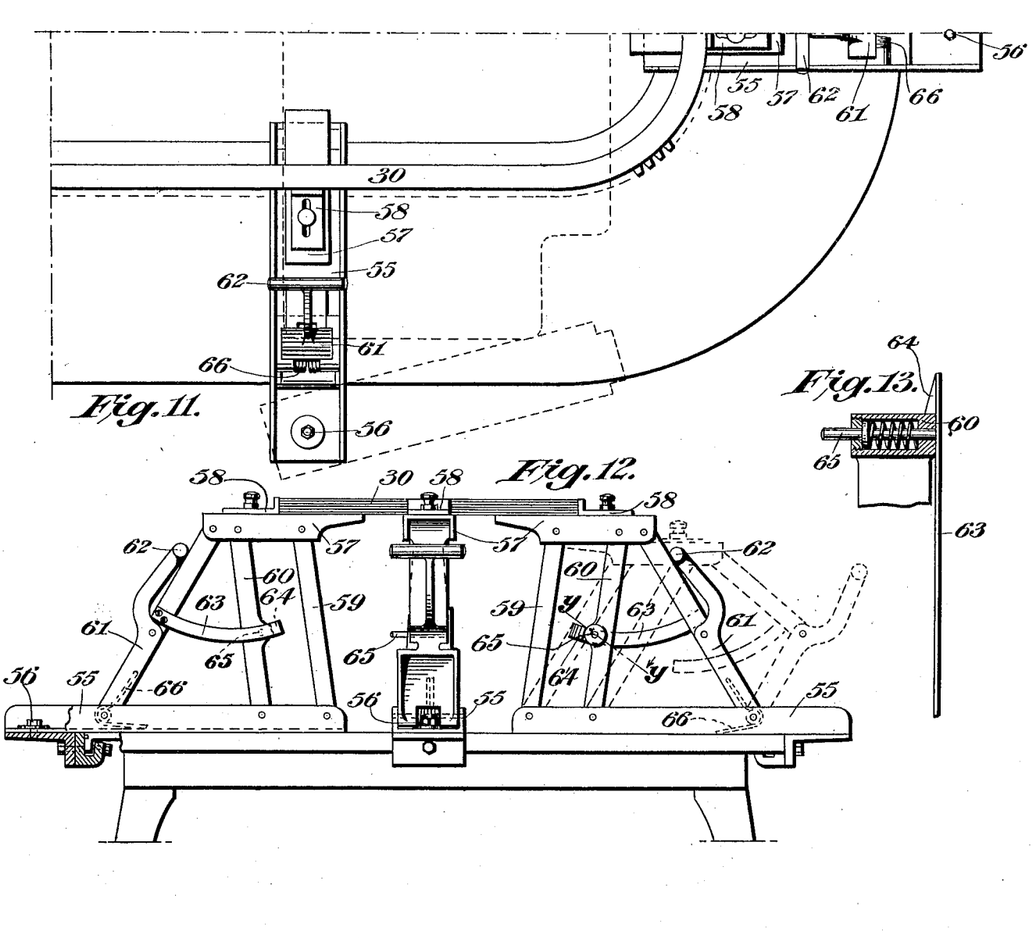
Fig. 11 is a plan view of one section of the table, showing a plan view of the support for the material to be wound and also illustrating in dotted lines how the support is automatically removed from the path of the guide of the bobbin.
Fig. 12 is an end view of a portion of the table, showing two side elevations and a rear view of the movable supports.
Fig. 13 is a detail of a catch on one of the supports.

57 is a block adapted to rest against the underside of the coil 30 or other part to be wound and may be provided with an adjustable shoulder 58. To this block 57 and the base 55 are pivoted arms 59 60, preferably parallel and of equal length. To the block 57 and the base is also pivoted a toggle-joint 61, formed of two parts, one of which may be provided with a handle 62. To one of the parts of the toggle is also fastened a spring 63, having a catch 64 at one end, which automatically springs over the arm 60 to hold the same, as shown in Fig. 13. Passing through the arm 60 and abutting against the spring 63 is a spring-pressed pin 65, (see Fig. 13,) which projects from the arm 60 toward the carriage, so that when the carriage approaches the support some part of the carriage will strike and push back the pin and release the catch 64 from engagement with the arm 60. The coiled spring 66 presses against one member of the toggle, so that when the catch is released the toggle will be thrown back into the position shown in dotted lines in Fig. 12, which will drop the supporting-block away from the coil 30. The carriage may then push the whole support bodily to one side, as shown in Fig. 11, if desired. After the carriage has passed an attendant can then throw up the toggle, which will raise the supporting-block 57 up against the coil 30.

Figure 8:
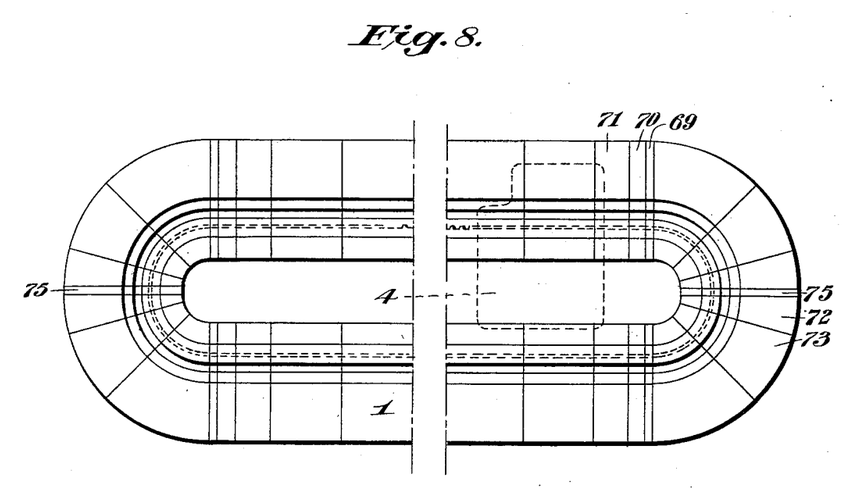
Fig. 8 is a plan view of the table, showing the preferable manner of dividing the same.

Transformer-coils are usually or often of an oval shape; but the expense would be great if different sizes of tables had to be made for the different sizes of coils. I have therefore provided a table which can be adjusted to accommodate different shapes and sizes. In the present embodiment, as seen in Fig. 8, I divide the table laterally of the long axis of the oval into a series of removable sections, and preferably the sides of the sections are provided with flanges 67, as seen in Fig. 1, so that the sections may be bolted together by bolts 68. The sections preferably increase by multiples of the width of the smallest section. For instance, I may make the section 69 of Fig. 8 the width of two teeth of the rack 3, the section 70 of twice the width of the section 69, section 71 of double the width of section 70, and so on. In this way I can obtain any length of table desired with a maximum error of only one-half the width of the smallest section. It is not necessary that the whole table should be so divided, for such a division of only a part thereof may suffice.

To provide for different shapes and sizes of curves in the coils, I have divided the curved ends radially of the curve into removable angular sections having a similar ratio, the angle formed by the sides of section 72 being one-half or one-third of that formed by the sides of 73. 75 75 are parallel-sided removable sections which I have put in to indicate that the table may be adjustable in width, for I may add several parallel-sided sections at these points similar to the sections 69, 70, and 71, if desired. In this way I am enabled to adjust the size and shape of my table to fit almost any coil desired.

Of course the machine above described will apply the covering material to any object held within the bobbin, and other materials besides tape may be used—for instance, I may wind armature-coils with a wire covering.

Figure 9:
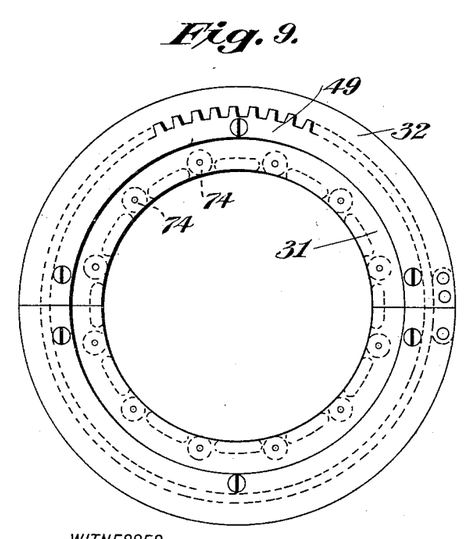
Figs. 9 and 10 are side elevations of a modified form of a bobbin.
Figure 10:
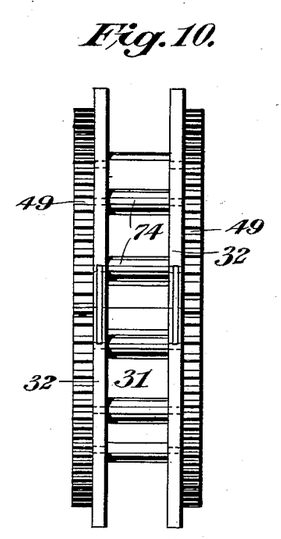

In Figs. 9 and 10 I have shown a modification of the bobbin 31. When tape covered with asphaltum or other adhesive substance is used, the friction upon the periphery of a bobbin, such as shown in Fig. 1, would probably be too great, and I may therefore provide the periphery of the bobbin with rolls 74, as shown in Figs. 9 and 10, to reduce the friction on the same.

It will be obvious that many changes may be made in the construction herein disclosed and the machine may be put to a variety of uses without departing from the spirit of my invention, and I therefore do not desire to limit myself to the particular embodiments or uses herein disclosed.

What I claim is—

1. In a winding-machine in combination, a guideway forming an endless circuit, a carriage adapted to travel along said guideway, automatic means to move said carriage along the same, and a guide for the covering material, said guide carried upon said carriage, and automatic means to revolve said guide around the part to be wound as said carriage moves along said guideway.

2. In a winding-machine in combination, a guideway forming an endless circuit, a carriage adapted to travel along said guideway, automatic means to move said carriage along the same, a holder for the covering material, and a guide for the covering material, said guide and holder being carried by said carriage, and automatic means to revolve said guide and holder around the part to be wound as said carriage moves along said guideway.

3. In a winding-machine in combination, a guideway, a carriage adapted to travel along said guideway, automatic means to move said carriage along the same, a hollow bobbin on said carriage to hold the covering material and adapted to surround the part to be wound, said bobbin provided with an aperture in its periphery forming a guide for the covering material, and automatic means to rotate said bobbin around the part to be wound as said carriage moves along said guideway.

4. In a winding-machine in combination, a guideway, a carriage adapted to travel along said guideway, automatic means to move said carriage along the same, a guide for a covering material, said guide carried by said carriage, automatic means to revolve said guide around the part to be wound as said carriage moves along said guideway, movable supports for said part to be wound, and means whereby said supports are automatically moved away from the path of said guide as said guide approaches said supports.

5. In a winding-machine in combination, a guideway, a carriage adapted to travel along said guideway, automatic means to move said carriage along the same, a guide for a covering material, said guide carried by said carriage, automatic means to revolve said guide around the part to be wound as said carriage moves along said guideway, movable supports for said part to be wound, and means whereby said supports are automatically dropped away from said part to be wound and moved away from the path of said guide as said guide approaches said supports.

6. In a winding-machine in combination, a hollow bobbin upon the periphery of which a covering material may be wound, said bobbin having an opening through its periphery to its said hollow portion which opening forms a guide for the passage of said covering material, and means to rotate said bobbin about its axis and leave an unobstructed passage through its hollow portion for the reception of the part to be covered.

7. In a winding-machine in combination, a hollow bobbin upon the periphery of which a covering material may be wound, said bobbin having a flange at each side of said periphery and an opening through its periphery to its said hollow portion, which opening forms a guide for the passage of said covering material, and means to rotate said bobbin about its axis and leave an unobstructed passage through its hollow portion for the reception of the part to be covered.

8. In a winding-machine in combination, a hollow bobbin upon the periphery of which a covering material may be wound, said bobbin having an opening through its periphery to its said hollow portion, which opening forms a guide for the passage of said covering material, means to rotate said bobbin about its axis and leave an unobstructed passage through its hollow portion for the reception of the part to be covered, and means to vary the resistance to the passage of said material through said guide.

9. In a winding-machine in combination, a hollow bobbin upon the periphery of which a covering material may be wound, said bobbin having an opening through its periphery to its said hollow portion, which opening forms a guide for the passage of said winding material, means to rotate said bobbin about its axis and leave an unobstructed passage through its hollow portion for the reception of the part to be covered, and means to vary the resistance of the passage of said material through said guide consisting of a plurality of bars located at said opening and substantially parallel with the axis of said bobbin.

10. In a winding-machine in combination, a hollow bobbin upon the periphery of which a covering material may be wound, said bobbin having an opening through its periphery to its said hollow portion, which opening forms a guide for the passage of said covering material, and means to rotate said bobbin about its axis and leave an unobstructed passage through its hollow portion for the reception of the part to be covered, said bobbin being provided with rollers forming part of its periphery.

11. In a winding-machine in combination, a hollow bobbin upon the periphery of which a covering material is adapted to be wound, said bobbin having an opening from its periphery to its hollow portion for the passage of said covering material, a plurality of rotatable supports for said bobbin to hold the same in position, and means to rotate said bobbin about its axis.

12. In a winding-machine in combination, a hollow bobbin upon the periphery of which a covering material is adapted to be wound, said bobbin having an opening from its periphery to its hollow portion for the passage of said covering material, a plurality of rotatable supports for said bobbin to hold the same in position, and means to rotate said bobbin on its axis, including a circular gear on said bobbin and a geared driving-wheel in mesh therewith.

13. In a winding-machine in combination, a hollow bobbin upon the periphery of which a covering material is adapted to be wound, said bobbin having an opening from its periphery to its hollow portion for the passage of said covering material, and a flange at each side of said periphery, a plurality of rotatable supports for said bobbin to hold the same in position, and means to rotate said bobbin about its axis.

14. In a winding-machine in combination, a hollow bobbin upon the periphery of which a covering material is adapted to be wound, said bobbin having an opening from its periphery to its hollow portion for the passage of said covering material, a circular flange at each side of said periphery, a plurality of smooth-faced wheels in contact with said bobbin to form supports for said bobbin to hold the same in position, and means to rotate said bobbin on its axis including a circular gear on said bobbin and a geared driving-wheel in mesh therewith.

15. In a winding-machine in combination, a guideway, a winding-guide, means to move the same along said guideway, a support in the path of said guide including a movable base pivoted to one side of said guideway, a pair of arms pivoted thereto at one end and at the other to a supporting-block, and means to automatically rock said arms on said pivots thereby lowering said supporting-block, and means to turn said base on its pivot and thereby move it and said block out of the path of said guide as the same approaches said support.

16. In a winding-machine in combination, a guideway, a winding-guide, means to move the same along said guideway, a support in the path of said guide including a movable base pivoted to one side of said guideway, a pair of parallel arms pivoted thereto at one end and at the other to a supporting-block, a catch to hold said arms in one position, and means to automatically release said catch and rock said arms on said pivots, thereby lowering said supporting-block, and means to turn said base on its pivot and thereby move it and said block out of the path of said guide as the same approaches said support.

17. In a winding-machine in combination, a guideway, a carriage adapted to travel along said guideway, a winding-guide on said carriage, a variable-speed-gear train between said guideway and guide including a rotating wheel, a pivoted arm, the pivot thereof coinciding with that of said wheel, adjustable means to fix said arm in position, a gear-wheel carried by said arm and connected with said first wheel whereby power may be transmitted between the two, and a relatively-stationary wheel in mesh with said gear-wheel, one of said wheels being removable.

18. In a winding-machine in combination, a guideway, a carriage adapted to travel along said guideway, a winding-guide on said carriage, a variable-speed-gear train between said guideway and guide including a removable wheel, a pivoted arm, the pivot thereof coinciding with that of said wheel, adjustable means to fix said arm in position, a gear-wheel carried by and movable longitudinally of said arm and connected with said first wheel whereby power may be transmitted between the two, and a relatively-stationary wheel in mesh with said gear-wheel.

19. In combination, a table provided with a guideway forming an endless oval circuit, a carriage adapted to move along said guideway and means to move said carriage, said table being divided laterally of the long axis of said oval into a series of removable sections, the width of said sections increasing by multiples of the width of one of said sections.

20. In combination, a table provided with a guideway forming an endless oval circuit, a carriage adapted to move along said guideway and means to move said carriage, said table being divided laterally of the long axis of said oval into a number of removable sections, the width of said sections increasing by multiples of the width of one of said sections, one end of said oval circuit being curved and said table being radially divided at this point into a number of sections the angles of which increase by multiples of the angle of one of said sections.

21. In a winding-machine in combination, a hollow bobbin adapted to surround a part to be wound and hold a covering material, means to rotate said bobbin and thereby wind said covering material off from said bobbin and upon said part to be wound and at the same time wind a fresh supply upon said bobbin.

22. In a winding-machine in combination, a guideway, a carriage adapted to travel along said guideway, automatic means to move said carriage along the same, means adapted to support and hold fixed adjacent said guideway an endless part to be wound, and means carried by said carriage and adapted to automatically wind a covering material over the whole length of said fixed endless part to be wound.

23. In a winding-machine in combination, a hollow bobbin adapted to surround a part to be wound and to hold a covering material wound thereon in superposed layers, means to rotate said bobbin and thereby wind the inner layer of said covering material off from said bobbin and upon said part to be wound, the portion of said covering material remaining upon the said bobbin sliding around the said bobbin as the same continues to rotate.

Signed at Pittsfield, Massachusetts, this 6th day of November, 1899.

BURDICK A. STEWART.

Witnesses:
GEORGE T. MAPLETOFT,
GEORGE SHIPCOY, Jr.